United States Patent
Cronin et al.

(10) Patent No.: US 9,870,585 B2
(45) Date of Patent: Jan. 16, 2018

(54) INTERACTIVE SEAT BEACON WITH CUSTOMIZATION

(71) Applicant: ProSports Technologies, LLC, Miami, FL (US)

(72) Inventors: John E. Cronin, Bonita Springs, FL (US); Seth M. Cronin, Clarksville, TN (US); Nick Reasner, Miami, FL (US)

(73) Assignee: PROSPORTS TECHNOLOGIES, LLC, Miami, FL (US)

( * ) Notice: Subject to any disclaimer, the term of this patent is extended or adjusted under 35 U.S.C. 154(b) by 0 days.

(21) Appl. No.: 14/798,275

(22) Filed: Jul. 13, 2015

(65) Prior Publication Data
US 2016/0012515 A1  Jan. 14, 2016

Related U.S. Application Data

(60) Provisional application No. 62/023,433, filed on Jul. 11, 2014, provisional application No. 62/047,187, filed on Sep. 8, 2014.

(51) Int. Cl.
G06Q 50/12 (2012.01)
G06Q 30/06 (2012.01)

(52) U.S. Cl.
CPC ......... *G06Q 30/0635* (2013.01); *G06Q 50/12* (2013.01)

(58) Field of Classification Search
CPC .................................................. G06Q 10/0631
See application file for complete search history.

(56) References Cited

U.S. PATENT DOCUMENTS

| 3,997,044 A | 12/1976 | Schasser |
| 5,797,126 A | 8/1998 | Helbling et al. |

(Continued)

FOREIGN PATENT DOCUMENTS

| CA | 2 625 887 | 9/2008 |
| EP | 2 213 503 | 1/2013 |

(Continued)

OTHER PUBLICATIONS

Rebecca Borison (Feb. 2014). Sports and entertainment venues flock to beacons for commerce opportunities. Mobile Commerce Daily.*

(Continued)

*Primary Examiner* — Peter L Ludwig
(74) *Attorney, Agent, or Firm* — Polsinelli LLP

(57) ABSTRACT

Event venues include multiple seats for eventgoers, and each seat may be coupled to a seat beacon. The seat beacon may identify the ticket of an eventgoer sitting in them, either by scanning it, interfacing with a user mobile device, or accepting manual input at an interface provided at the seat. A centralized event venue controller may check the ticket identifier against seat identifiers in a ticket purchase information database. If the eventgoer is in the wrong seat, the seat may identify itself locally by lighting a light or remotely by notifying an administrator device. If the eventgoer is in the correct seat, the seat beacon may be used by the eventgoer to order food, drinks, Wi-Fi access, or seat customizations such as a seat heater or a name tag or a cooling cup holder. Such seat customizations can also be provided at the time of ticket purchase.

19 Claims, 8 Drawing Sheets

(56) References Cited

U.S. PATENT DOCUMENTS

| | | | |
|---|---|---|---|
| 7,044,362 B2 | 5/2006 | Yu | |
| 7,080,882 B2 | 7/2006 | Stitt | |
| 8,313,018 B2 | 11/2012 | Wang et al. | |
| 8,639,541 B2 | 1/2014 | Sunshine et al. | |
| 8,676,615 B2* | 3/2014 | Callaghan | G06Q 10/02 348/222.1 |
| 9,319,838 B1 | 4/2016 | Cronin | |
| 9,330,570 B2 | 5/2016 | Wang et al. | |
| 9,659,102 B1 | 5/2017 | Cronin | |
| 2002/0087395 A1 | 7/2002 | Goodman | |
| 2003/0014330 A1* | 1/2003 | Showghi | G06Q 10/063 705/7.22 |
| 2003/0069904 A1 | 4/2003 | Hsu et al. | |
| 2003/0076417 A1 | 4/2003 | Thomas et al. | |
| 2004/0004376 A1 | 1/2004 | Cabebe | |
| 2006/0250278 A1 | 11/2006 | Tillotson | |
| 2007/0054695 A1 | 3/2007 | Huske et al. | |
| 2008/0146302 A1 | 6/2008 | Olsen et al. | |
| 2010/0082374 A1 | 4/2010 | Charania et al. | |
| 2010/0219234 A1 | 9/2010 | Forbes | |
| 2011/0147448 A1 | 6/2011 | Manuel-Devadoss | |
| 2011/0173032 A1 | 7/2011 | Payne et al. | |
| 2011/0246369 A1 | 10/2011 | de Oliveira et al. | |
| 2012/0149396 A1 | 6/2012 | Fan et al. | |
| 2013/0096981 A1 | 4/2013 | Evans et al. | |
| 2013/0151295 A1 | 6/2013 | Denker et al. | |
| 2013/0159030 A1 | 6/2013 | Tattenbaum et al. | |
| 2013/0251216 A1* | 9/2013 | Smowton | H04L 9/3231 382/118 |
| 2013/0290413 A1 | 10/2013 | Jones | |
| 2013/0300073 A1 | 11/2013 | Venton-Walters et al. | |
| 2013/0325525 A1 | 12/2013 | Boyd | |
| 2013/0325621 A1 | 12/2013 | Sanginiti et al. | |
| 2013/0346121 A1 | 12/2013 | Shealy et al. | |
| 2014/0100896 A1 | 4/2014 | Du et al. | |
| 2014/0100898 A1 | 4/2014 | Bruckhaus et al. | |
| 2014/0176348 A1 | 6/2014 | Acker et al. | |
| 2014/0188614 A1 | 7/2014 | Badenhop | |
| 2014/0195277 A1* | 7/2014 | Kim | G08B 5/221 705/5 |
| 2014/0292481 A1 | 10/2014 | Dumas et al. | |
| 2014/0330881 A1 | 11/2014 | Stone et al. | |
| 2014/0379819 A1 | 12/2014 | Chestnut et al. | |
| 2015/0057025 A1* | 2/2015 | Malik | H04W 4/023 455/456.3 |
| 2015/0063646 A1 | 3/2015 | Wang et al. | |
| 2015/0066545 A1 | 3/2015 | Kotecha et al. | |
| 2015/0120342 A1 | 4/2015 | Dragon et al. | |
| 2015/0227969 A1* | 8/2015 | Hanly | G06Q 30/0252 705/14.5 |
| 2015/0242888 A1* | 8/2015 | Zises | G06Q 30/0252 705/14.5 |
| 2015/0262086 A1* | 9/2015 | Mader | G06Q 10/02 705/5 |
| 2015/0319223 A1 | 11/2015 | Deepak Narayana et al. | |
| 2015/0382144 A1* | 12/2015 | Lopez | H04W 4/023 455/456.2 |
| 2016/0055690 A1 | 2/2016 | Raina et al. | |
| 2016/0071030 A1 | 3/2016 | Cronin | |

FOREIGN PATENT DOCUMENTS

| | | |
|---|---|---|
| WO | WO 2002/065358 | 8/2002 |
| WO | WO 2008/124168 | 10/2008 |
| WO | WO 2013/070271 | 5/2013 |
| WO | PCT/US15/40205 | 7/2015 |
| WO | PCT/US15/47708 | 8/2015 |
| WO | WO 2016/007961 | 1/2016 |
| WO | WO 2016/040031 | 3/2016 |

OTHER PUBLICATIONS

Claire McDonald (Mar. 2014). Znap mobile payment platform. Inspect-a-Gadget.*
PCT Application No. PCT/US2015/040205 International Search Report and Written Opinion dated Dec. 3, 2015.
PCT Application No. PCT/US2015/047708 International Search Report and Written Opinion dated Nov. 27, 2015.
Alemzadeh, Mehrnoush; "Movie Ticket Dispenser Website (web-app) MTD", SENG 697: Agent-Based Software Engineering, Oct. 2006.
"Apple Introduces us to a New iTunes "Concert Ticket +" System", Patently Apple, Apr. 15, 2010.
Bayless et al., Steven H.; "Smart Parking and the Connected Consumer—Opportunities for Facility Operators and Municipalities", The Intelligent Transportation Society of America (ITS America) Dec. 2012.
Borison, Rebecca; "Golden State Warriors enhance game day with beacon technology", Mobile Commerce Daily—Software Technology, Mar. 25, 2014.
"Chair Features", The Back Massagers. Date of Download: May 1, 2014 http://www.thebackmassager.com/Chair_Features.html.
Chaumette et al., Serge; "Architecture and Evaluation of a User-centric NFC-enable Ticketing System for Small Events", Mobile Computing, Applications, and Services, vol. 95, 2012.
Cole, Shane; "MLB stadiums to deploy Apple's iBeacons for fan convenience, interactivity", appleinsider, Sep. 27, 2013.
COZZIA Instruction Manual EC-380, Oct. 14, 2015.
Emmerton et al., Craig; "Parkme Final Report", Parkme System, Dec. 12, 2008.
EventMobi—Simple Set-up, Custom Branding, Enhanced Sponsorship, Personal Agendas, Document Hosting, Audience Response, Multi-Event Conference App, Usage Analytics and More. Date of Download: Aug. 5, 2014, Http://www.eventmobi.com/product/features/.
"Fulham FC", Fulham Football Club, Aug. 6, 2014.
"Getting Started Guide", Flash Seats®Sysem, Oct. 14, 2015.
Grabkowski, Leonardo R.; "How to Activate Ford Heated Seats With a Remote Starter", eHOW, Date of Download: May 1, 2014 http://www.ehow.com/how_7685949_activate-heated-seats-remote-starter.html.
Hammond, Teena; "Stadiums race to digitize: How sports teams are scrambling to keep Millenials coming to games", TechRepublic. Apr. 12, 2014.
Ichinose, Noriyoshi; "Mobile E-Ticket and E-Membership Services", NEC Journal of Advanced Technology, vol. 1, No. 3. Jul. 6, 2004.
Kelly, Samantha M.; "Apple Feature to Turn MLB Stadiums Into Interactive Playgrounds", Mashable, Sep. 26, 2013.
Kleinmann, Zoe; "Luxury toilet users warned of hardware flaw", BBC News Technology, Aug. 5, 2013.
"Launch of ParkHub.com Brings Online Reservation System to the Parking Lot", Yahoo Finance, Dec. 29, 2010.
Nash, Alastair; "Beacons—a digital revolution in the making?" Orange Digital perspectives, May 19, 2014.
"NCAA.com launches event apps for 2014 Men's and Women's Final Four", NCAA.com, Apr. 3, 2014.
"New Features on the Center's Web Site Give Patrons Their Very Own Box Office Right at Their Home Computer", Segerstrom Center for the Arts, New & Noteworthy. Date of Download: May 19, 2014.
Payeras-Capella et al., Magdalena; "A secure e-ticketing scheme for mobile devices with Near Field Communication (NFC) that includes exculpability and reusability", IEICE Trans. Fundamentals, vol. E93-A, No. 1 Jan. 2010.
Philadelphia Eagles Mobile App—May 8, 2014.
Rao, Leena; "ParkWhiz Is The OpenTable for Parking Spots", TechCrunch, Jul. 25, 2010.
"Revolutionising ticketing and event management globally", VEVA., Feb. 1, 2007.
"Singapore Grand Prix", Singapore GP PTE LTD, Jul. 31, 2014.
Suparta, Wyan; "Application of Near Field Communication Technology for Mobile Airline Ticketing", Journal of Computer Science 8 (8): 1235-1243, 2012, ISSN 1549-3636 © 2012 Science Publications.

(56) References Cited

OTHER PUBLICATIONS

Tennyson, Shawn; "iBeacon = Bluetooth Bliss", Sundog, Feb. 4, 2014.
Tong, Brian; "The technology behind NBA 2K13", CNET, Oct. 1, 2012.
Van Veghel, Katie A.; "Chicago Bulls Release Official Team App—Should Other NBA Teams Follow?", SportTechie.com, Feb. 6, 2014.
Wang, Hongwei; "A Reservation-based Smart Parking System", Computer Science and Engineering, University of Nebraska—Lincoln, Jul. 1, 2011.
"znap Stadium Solutions—Manage an entire ecosystem, all within a single app", znap, www.znap.com, Mar. 31, 2014.
U.S. Appl. No. 14/838,181 Office Action dated Oct. 15, 2015.
U.S. Appl. No. 14/839,151 Office Action dated Oct. 23, 2015.
U.S. Appl. No. 14/788,751, filed Jun. 30, 2015, John E. Cronin, Event Application.
U.S. Appl. No. 14/8338,181, filed Aug. 27, 2015, Maxx T. Garrison, Content Delivery.
U.S. Appl. No. 14/839,151, filed Aug. 28, 2015, John E. Cronin, Parking Space Reservation.
U.S. Appl. No. 15/076,043 Office Action dated Dec. 15, 2016.
U.S. Appl. No. 15/076,043, filed Mar. 21, 2016, John E. Cronin, Event Application.
U.S. Appl. No. 14/838,181 Office Action dated May 20, 2016.
U.S. Appl. No. 14/839,151 Final Office Action dated Apr. 12, 2016.
U.S. Appl. No. 14/838,181 Office Action dated Jun. 19, 2017.
U.S. Appl. No. 14/839,151 Office Action dated Aug. 9, 2017.

* cited by examiner

FIG. 4

Customization GUI 155

Select customization for your seat 470

120 → Customization A
Type: chilled cup holder
Price: $5.00
A 405
Order? ☑

125 → Customization B
Type: seat heater
Price: $7.00
B 410
Order? ☑

130 → Customization C
Type: digital name plate
Price: $2.00
C 415
465 → Order? ☑
Enter Name: _____

425 → Customization N
Type:
Price:
N 420
Order? ☐

Enter ticket ID 430
Enter billing information 435
Name 440
Address 445
Credit card number 450
Subtotal: $14.00 455
Order customization 460

INTERACTIVE SEAT BEACON WITH CUSTOMIZATION

CROSS-REFERENCE TO RELATED APPLICATIONS

The present application claims the priority benefit of U.S. provisional application No. 62/023,433 filed Jul. 11, 2014 entitled "Seat Beacon," as well as U.S. provisional application No. 62/047,187 filed Sep. 8, 2014 entitled "Seat Beacon With Digital Customization," the disclosures of which are hereby incorporated by reference.

BACKGROUND

Field of Invention

The present invention generally relates to event venue seat interaction. More specifically, the present invention relates to interactions between a computerized event venue seat and a centralized event venue controller allowing customization of the event venue seat, security functions, and ordering of goods and services.

Description of the Related Art

Larger events, such as concerts or sporting events, are typically held in larger event venues, such as stadiums. Typically, event venues include a performance area, such as a sport field, or a sport arena, or a sport court, or a concert stage, or a lecture stage. Sometimes, cameras are set up in the performance area to capture sports play from predetermined angles. Typically, event venues include a eventgoer area, such as stadium seating, bleachers, theater seating, or a standing room eventgoer area. Typically, some parts of the eventgoer area provide better views or better acoustics of parts of events occurring within the performance area than other parts of the eventgoer area.

Typically, all seats in an event venue are more or less the same, with no way for an individual to request customizations to a particular seat or set of seats.

While typical chairs allow for a user to sit, some chairs may also include seat warmers, cup holders, name tags, or other additions.

Eventgoers going to an event held at a large event venue typically may order food, drinks, or other items at concession stands located throughout the event venue. Typically, an eventgoer must get out of his or her seat to order and receive such food and drinks, or wait for a moving concession vendor to walk close to his or her seat.

Traditionally, the field of digital communications includes wired and wireless transfer of information. Digital communications may include direct communications in which information is transmitted from a sender device to a recipient device, and may also include "indirect" communications in which information is transmitted from a sender device, through one or more "intermediary" or "middleman" devices, and eventually to a recipient device.

One example of wired transfer includes data transmitted from a sender device to a recipient device using a Universal Serial Bus (USB) cable. Another example of a wired transfer includes data transmitted within a private Local Area Network (LAN) from a sender device to a router through a sender Ethernet cable, and from the router to a recipient device through a recipient Ethernet cable.

One example of wireless transfer includes data transmitted from a sender device to a recipient device using a Bluetooth protocol connection. Another example of a wired transfer includes data transmitted within a private Wireless Local Area Network (WLAN) from a sender device to a router through a wireless Wi-Fi connection, and from the router to a recipient device through a wireless Wi-Fi connection. Another example of wireless transfer is Visible Light Communication (VLC).

Traditional wireless communications may be received and read by any recipient device within a range in which information transmitted wirelessly by a sender device can be interpreted. In some cases, information transmitted wirelessly by a sender may be within range of an unintended recipient.

Advertising a brand, a product, or a service is often an effective means for a business to obtain new customers and reinforce loyalty in existing customers. Advertising can be particularly effective if targeted at the correct audience, such as when a sport fan is told that buying a particular product will support his/her favorite team. Often, seating at sport stadiums during sporting events is divided into "sections" devoted to fans of one of the teams playing.

Advertising can be a particularly useful source of revenue during sporting events, such as football games. By using advertising, revenues may be raised, the cost of tickets may be brought down, and more fans may be allowed to go to a particular sports game.

Thus, a means of audiovisual content collection and distribution is needed.

SUMMARY OF THE CLAIMED INVENTION

One exemplary method for event venue seat interaction includes receiving a ticket identifier from a seat beacon associated with a seat, the seat having a seat identifier. The method also includes querying a ticket database to determine that the ticket identifier matches ticket purchase information identifying the seat identifier. The method also includes transmitting an match response to the seat beacon, the match response indicating that the ticket identifier matches the seat identifier. The method also includes receiving a transaction order from the seat beacon, the transaction order requesting one of a good or a service. The method also includes transmitting an action command to a provider that can fulfill the request of the transaction order.

One exemplary system for event venue seat interaction includes a a seat beacon associated with a seat at an event venue, and an event venue controller. Execution of instructions stored in a memory of the event venue controller by a processor of the event venue controller performs various system operations. The system operations include receiving a ticket identifier from a seat beacon associated with a seat, the seat having a seat identifier. The system operations also include querying a ticket database to determine that the ticket identifier matches ticket purchase information identifying the seat identifier. The system operations also include transmitting an match response to the seat beacon, the match response indicating that the ticket identifier matches the seat identifier. The system operations also include receiving a transaction order from the seat beacon, the transaction order requesting one of a good or a service. The system operations also include transmitting an action command to a provider that can fulfill the request of the transaction order.

Another exemplary method for event venue seat interaction includes receiving a ticket identifier from a seat beacon associated with a seat, the seat having a seat identifier. The method also includes querying a ticket database to determine that the ticket identifier does not match ticket purchase information identifying the seat identifier. The method also includes triggering an alert identifying the ticket identifier and the seat identifier as incorrectly paired. The method also includes preventing the seat beacon from transmitting a transaction order until a correct ticket identifier is received, the correct ticket identifier matching ticket purchase information identifying the seat identifier, the transaction order requesting one of a good or a service.

BRIEF DESCRIPTION OF THE DRAWINGS

FIG. 4 illustrates an exemplary customization graphical user interface.

DETAILED DESCRIPTION

Event venues include multiple seats for eventgoers, and each seat may be coupled to a seat beacon. The seat beacon may identify the ticket of an eventgoer sitting in them, either by scanning it, interfacing with a user mobile device, or accepting manual input at an interface provided at the seat. A centralized event venue controller may check the ticket identifier against seat identifiers in a ticket purchase information database. If the eventgoer is in the wrong seat, the seat may identify itself locally by lighting a light or remotely by notifying an administrator device. If the eventgoer is in the correct seat, the seat beacon may be used by the eventgoer to order food, drinks, Wi-Fi access, or seat customizations such as a seat heater or a name tag or a cooling cup holder. Such seat customizations can also be provided at the time of ticket purchase.

Figure 1:
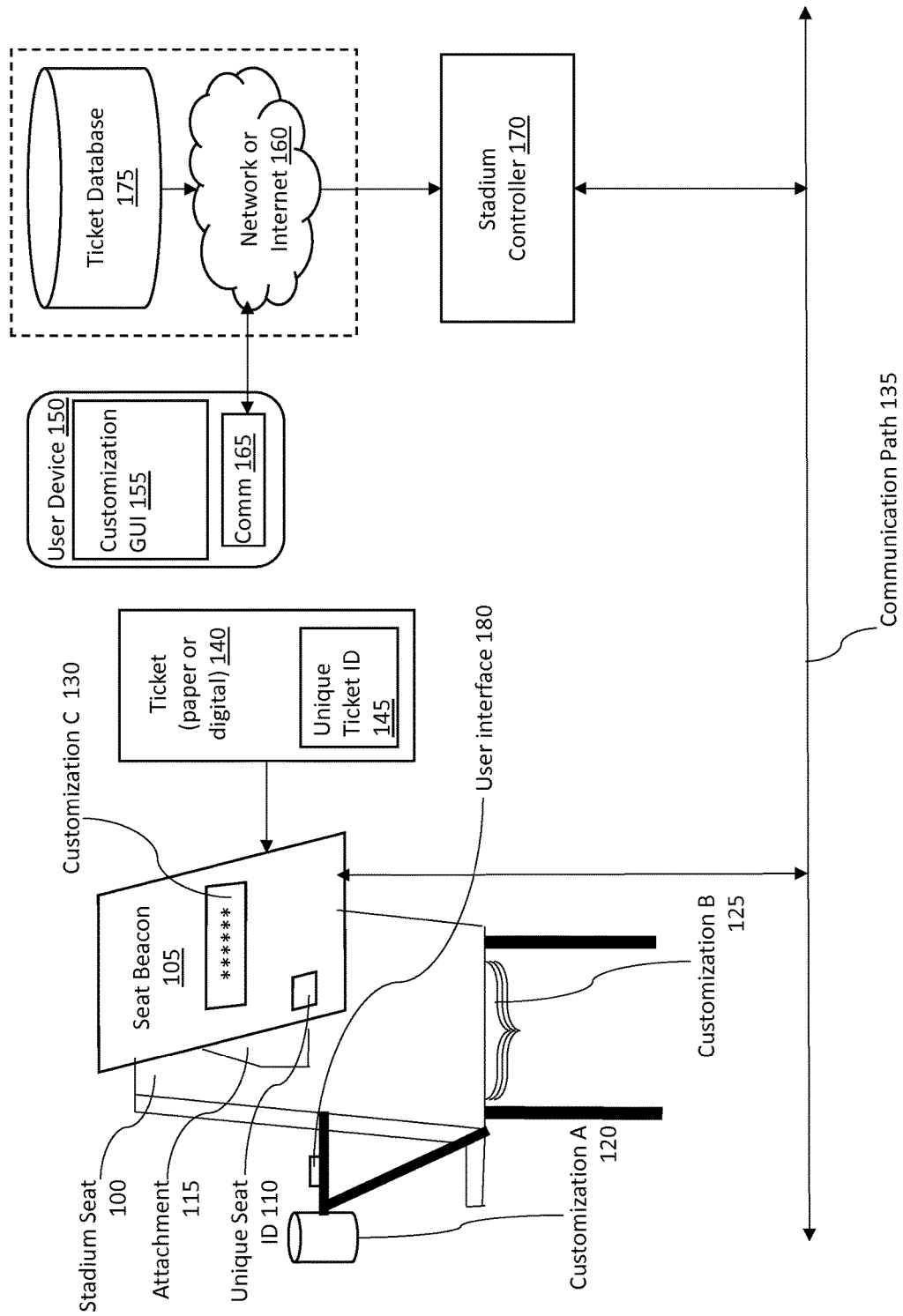
FIG. 1 illustrates an exemplary customized stadium seat ecosystem.

FIG. 1 illustrates an exemplary customized stadium seat ecosystem.

The stadium seat ecosystem of FIG. 1 includes a stadium seat 100, which may be located in a stadium or other type of event venue in which an event is hosted or watched. Such events include a wide variety of sporting events such as football (American and Global), baseball, basketball, soccer, ice hockey, lacrosse, rugby, cricket, tennis, track and field, golf, cycling, motor sports such as automobile or motorcycle racing, horse racing, Olympic games, and the like; cultural events such as concerts, music festivals, plays, or the opera, and the like; religious events; and more permanent exhibitions such as a museum, historic home, and the like. The "event venue" discussed herein may also be a transport vehicle, such as a plane, boat, bus, tram, or train, and the seat 100 may be a seat located within such a transport vehicle.

The seat 100 may include a seat beacon 105, which may be a computer system 800, or may be a more pared-down computerized device that includes a subset of the elements of a full computer system 800. The possible internals of the seat beacon 105 are discussed further in FIG. 2.

The seat beacon 105 may be used by an eventgoer sitting in the seat 100 to accomplish various tasks, such as ordering goods (e.g., food or drinks) or services (e.g., wireless Wi-Fi internet access) remotely via a user interface 180. The user interface 180 may be a graphical user interface shown on a display (which may be any kind of display 870), a mechanical user interface (e.g., buttons, switches, knobs, sliders, or a touchscreen functionality in the display), or some combination thereof, and may be located at least partially in a place that is accessible to an eventgoer sitting in the seat 100, such as an armrest of the seat 100 (e.g., as pictured in FIG. 1) or the back of a second seat located in front of the seat 100 or some combination thereof.

The seat 100 may be associated with a paper ticket 140 or a digital ticket 140, where information associated with the digital ticket may be stored at a user device 150. The paper ticket 140 or digital ticket on the user device 150 may identify a seat 100 that the purchaser of the ticket selected prior to going to the event, or that was assigned to the purchaser of the ticket prior to going to the event (e.g., while purchasing the ticket or some time after the purchase but before the event). It should be noted that such tickets may be free, in which case the word "purchased" should be understood to include "free" purchases for zero currency, also referred to as giveaways.

The seat beacon 105 may be used as a security device to make sure that an eventgoer is sitting in the correct seat 100 by first detecting that someone is sitting in the seat, and then secondly requiring the eventgoer sitting in the seat to identify their paper ticket 140 or digital ticket to ensure that it is the ticket that is associated with that particular seat 100. The seat 100 may include pressure sensors and/or thermal sensors within the seat 100 to detect if someone is sitting in the seat 100. The seat 100 may then prompt the eventgoer sitting in the seat 100 to identify himself or herself via his or her ticket, using for example a light or a display or a speaker with a sound. The seat 100 may then identify the ticket in any number of ways, and if the ticket is the correct ticket (i.e., the ticket associated with that seat 100 for the duration of that event), then the seat beacon 105 could function normally (e.g., allowing the eventgoer to place an order for drinks or food) or even present the eventgoer with a reward (e.g., a discount for food, drinks, event memorabilia, concessions, or even a free gift).

If the seat 100 does not identify a ticket either immediately after the seat 100 detects that an eventgoer has sat down in the seat 100, or within a predetermined time interval after the seat 100 detects that an eventgoer has sat down in the seat 100, the seat 100 could "penalize" the eventgoer in a number of ways. For example, the seat 100 could refuse to allow access to an interface for ordering food or drinks, or could refuse to honor the eventgoer's orders for food or drinks. The seat 100 could try to make the set more uncomfortable to sit in, by for example adjusting the seat height or seat angle or seat back angle or seat back height to a strange position, or curving part of the seat, or by outputting an unpleasant light or noise at the eventgoer sitting in the seat 100, or by vibrating or moving the seat in an unpleasant manner, or even by delivering a small electric shock to the eventgoer sitting in the seat 100. The seat 100 may also identify eventgoers that have not identified their ticket to event managers or administrators, for example using a localized alert (e.g., a colored light indicator or a popped up sign or a particular "warning" interface being displayed on a display associated with the seat 100) or a remote alert (e.g., sending an alert signal or alert message to a stadium controller 170 (the term stadium controller 170 should be understood to refer to an event venue controller 170 if the event venue in question is not a stadium) via a communication path 135 identifying a unique seat identifier 110 corresponding to the seat 100 and/or a unique ticket identifier 145 associated with any ticket that was presented if it was an incorrect ticket).

There are several ways that the seat 100 and/or the seat beacon 105 could use to identify the ticket of the eventgoer within the seat 100. The seat 100 may include a scanner (e.g., a barcode scanner or a Quick Response "QR" code scanner or an image-based scanner with optical character recognition), which may be used to scan a paper ticket 140 or a digital ticket displayed on a display of a user device 150. The seat 100 may also include a near-field communication (NFC) system that receives digital ticket information from the user device 150 via an NFC technology such as Bluetooth (e.g., standard Bluetooth, Bluetooth smart, Bluetooth low-energy), active or passive radio-frequency identification (RFID), magnetic resonance or induction communication, sonic communication (e.g., audibly sonic, infrasonic, or ultrasonic), visible light communication (VLC), or other types of local wireless data transfer.

The seat 100 and/or the seat beacon 105 may also use the user interface 180 of the seat beacon 105 (e.g., which may be a GUI or a mechanical user interface or some combination thereof as described above) to allow an eventgoer sitting in the seat 100 to manually input identifying data (e.g., using a physical or touchscreen-based keyboard or keypad), such as the unique ticket identifier (ID) 145 of the ticket 140, or a barcode number associated with the ticket 140, or a name or username or email address of the eventgoer associated with the ticket 140.

Regardless of how the seat beacon 105 obtains information identifying the ticket 140, once it obtains this information, it may check that the ticket 140 identified is the correct ticket (e.g. the ticket assigned to that unique seat identifier 110) by checking against a ticket database 175. The ticket database 175 may be a database or other data structure where information is stored identifying which ticket ID 145 corresponds to which seat ID 110, and may be for example a database provided by a ticket sales entity, such as an internet ticket sales website (e.g., "Ticketmaster" or "Stubhub"), a local electronic ticket sales register system, a local paper-based ticket sales system that whose data is then manually entered into a database, or some combination thereof. In the ecosystem pictured in FIG. 1, the seat beacon 105 checks the ticket ID 145 by communicating it to the stadium controller, which accesses a network (e.g., local area network or wireless local area network) or the internet 160 to access the ticket database 175 to then report back to the seat beacon 105. The communication path 135 between the seat beacons 105 and the stadium controller 175 may be wires or wireless. In some cases, the seat beacon 105 may instead directly access the ticket database 175 without using the stadium controller 170 as a proxy system.

The seat beacon 105 of FIG. 1 is shown attached to the back of the seat 100 via an attachment 115, but in other embodiments, it may be embedded within the seat 100 (e.g., under the seat cushions or behind the seat back cushions), attached under the seat 100, embedded within or attached to the armrests of the seat 100, embedded within or attached to the legs of the seat 100, or some combination thereof.

The seat 100 may also include various customizations, which may be ordered before the event (e.g., while the eventgoer is purchasing his or her ticket) or may be ordered during the event via the user interface 180 of the seat 100, or some combination thereof. For example, the seat 100 of FIG. 1 is illustrated with three customizations. The first customization, identified as customization A 120, is a cupholder added to the seat 100 (e.g., to an armrest of the seat 100). The second customization, identified as customization B 125, is a seat heating element added to the seat 100 (e.g., below the seat 100). The third customization, identified as customization C 130, is a customized name card or name plaque added to the seat 100 (e.g., behind the seat 100). Such customizations can be used to give eventgoers a better and more personal experience, to obtain additional revenue (e.g., by charging money for the customizations), and to further incentivize eventgoers to sit in their assigned seats (e.g., by denying the ability to order customizations via the user interface 180 for eventgoers who have not identified the correct ticket ID 145 to the seat beacon 105, or by turning off electronic customizations such as the heating element of customization B 125 for eventgoers who have not identified the correct ticket ID 145 to the seat beacon 105).

The user device 150 may be any type of computing system 900, and may be, for example, a smartphone, a laptop, a portable media player device, a portable video game console, or a portable e-book reader device. The user device 150 may include a communication module ("comm") 165, which may include any wired data transfer or wireless data transfer systems. The functions identified as being performed above by the user interface 180 may also be performed by a graphical user interface (GUI) on the user's user device 150, such as a customization GUI 155 (e.g., which may be stored in a memory of the user device 150 and executed by a processor of the user device 150).

Figure 2:
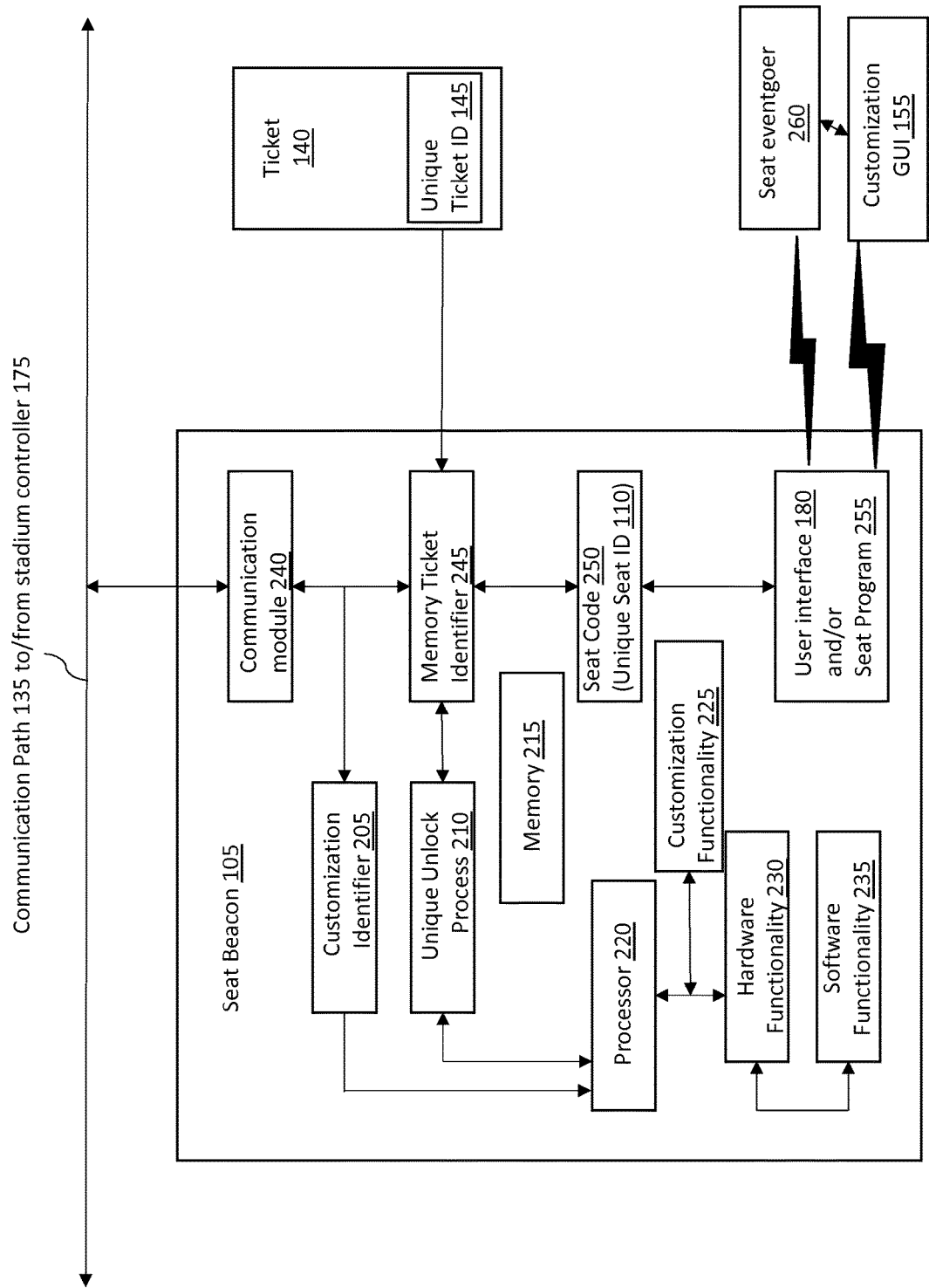
FIG. 2 illustrates an exemplary seat beacon.

FIG. 2 illustrates an exemplary seat beacon.

The seat beacon 105 may be any type of computer 800. The seat beacon 105 includes a memory 215, which may include any kind of memory 820, mass storage 830, or portable storage 840. The seat beacon 105 also includes a processor 220, which may be any type of processor 810. The seat beacon 105 may include various functions described below, which may be hardware functions 230 (e.g., with associated hardware), software functions 235 (e.g., executed by the processor 230 and stored in the memory 215), or some combination thereof.

The functions may include customization functions 225, which as described in FIG. 1 allow an eventgoer sitting in the seat 100 to select customizations for the seat 100 either before the event (e.g., while ordering the ticket) or during the event (e.g., using the user interface 180 or the customization GUI 155 of the user device 150). The seat beacon 105 may include a customization identifier function 205 to identify which customizations were selected using these interfaces (or beforehand) and either implements these customizations automatically if possible or contact administrative personnel to install the requested customizations.

The seat beacon 105 may include a memory ticket identifier 245, which may identify a ticket 140 via its unique ticket identifier 145 (e.g., via a scanning process or a manual input through user interface 180 or customization GUI 155 of the user device 150) as described in relation to FIG. 1. The memory ticket identifier 245 may be associated with a unique unlock process 210 which may provide the security functionality described in relation to FIG. 1. The ticket identifier 245 may inter-cooperate with a seat code 250 in order to unlock hardware and software functionalities at the seat beacon.

The seat beacon 105 may include a communication module 240 in order to connect to the communication path 135 to and from the stadium controller 175. The communication module 240 may include any system necessary for a wired connection, a wireless connection, or any combination thereof.

The seat beacon 105 may also include the user interface 180, which may be used to interact with the seat eventgoer 260 (e.g., the eventgoer sitting in the seat 100). The seat program 255 may be a program executed as part of the user interface 180, or it may be a program executed to allow the seat beacon 105 to communicate with the customization GUI 155 of the user device 150, or some combination thereof.

Figure 3:
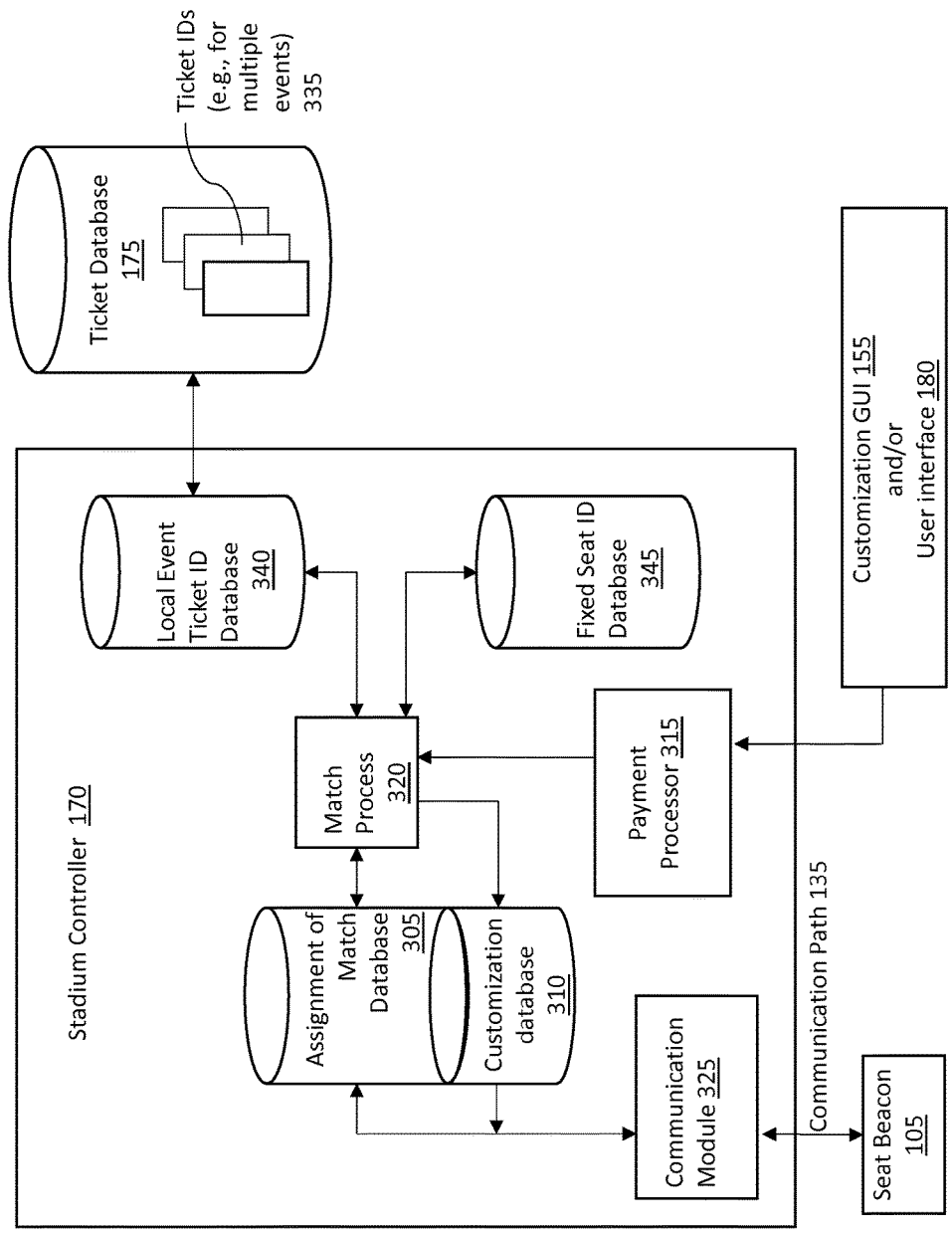
FIG. 3 illustrates an exemplary stadium controller.

FIG. 3 illustrates an exemplary stadium controller.

The stadium controller 170 may be any type of computer 800. The stadium may include a communication module 325, which may include any system necessary for a wired connection, a wireless connection, or any combination thereof. The stadium controller 170 may include a memory (not shown), which may include any kind of memory 820, mass storage 830, or portable storage 840. The memory may store a variety of databases or other data structures.

The communication module 325 may be used to communicate with one or more seat beacons 105 via a wired or wireless communication path 135. The communication module 325 may also be used to access the ticket database 175 described in relation to FIG. 1, which may include ticket data 335 for one or more tickets and one or more events (e.g., from a ticket sales website). The stadium controller 170 may pull data from the ticket database 175 related to a single event in question (e.g., or multiple events held at the same event venue) into a local event ticket ID database 340.

If the ticket data from the ticket database 175 does not already include seat selection data, the tickets may be matched to seats through a match process 320 that accepts inputs from the local event ticket ID database 340 (or the ticket database 175 directly) as well as a fixed seat ID database 345 that includes numerous unique seat identifiers 110. The output of the match process 320 may be stored in an assignment of match database 305, which stores both a ticket ID 145 and a seat ID 110 for each ticket sold. The match process 320 may also receive an input from a payment processing system 315, which may accept payments from the customization GUI 155 of the user device 150, the user interface 180 of the seat beacon 105, or a ticket-purchasing interface used to purchase the tickets. The payment received by the payment processor 315 may then be used to assign a "better" (e.g., closer to a performance area) or "worse" (e.g., farther from a performance area) seat 100 in an event venue, and may also be used to pay for various customizations of the seat 100. The customizations associated with each ticket ID 145 and seat ID 110 may then be stored in a customization database 310.

The seat beacon 105 may then communicate with the stadium controller 170 via the communication module 325 to obtain match information from the assignment of match database 305 and customization information from the customization database 310.

In situations where the user chooses a seat when purchasing from a third party, the fixed seat ID database 345 may be fed to the ticket selling entity and/or into the ticket database 175. The third party ticket seller may also be used as an input into the payment processor 315.

FIG. 4 illustrates an exemplary customization graphical user interface.

The customization GUI 155 may be shown at the user device 150, but may also alternately be shown at the user interface 180 associated with the seat beacon 105 of the seat 100.

The customization GUI 155 of FIG. 4 may include a variety of GUI elements. For example, the customization GUI 155 of FIG. 4 includes a customization-selection grid 470, where various customizations are shown, along with prices for these customizations and an interface element (e.g., a checkbox) allowing an eventgoer to order one or more of the available customizations. In FIG. 4, all four selection boxes in the customization-selection grid 470 are marked as selected.

The customization-selection grid 470 of FIG. 4 includes a selection box A 405, which charges five dollars for customization A 120, which is identified as a chilled cup holder. The customization-selection grid 470 also includes a selection box B 410, which charges seven dollars for customization B 125, which is identified as a seat heater. The customization-selection grid 470 also includes a selection box C 415, which charges two dollars for customization C 130, which is identified as a digital name plate (e.g., with the name of the ticket holder). The customization-selection grid 470 also includes a selection box N 420, which charges an unlisted amount for customization N 425, which is not identified. Selection box N 420 is used to exemplify a format which may be used by another customization to be sold or given within customization-selection grid 470. In some cases, special discounts, promotions, or giveaways may be presented (e.g., a customization may be given out for free temporarily, or groups of customizations may cost less than the same customizations individually, or fans of a particular team may get a special discount).

The customization GUI 155 of FIG. 4 also includes GUI elements for various personal data entry. For example, the customization GUI 155 of FIG. 4 allows the user to enter his/her ticket ID 110 in the "enter ticket ID" element 430. The customization GUI 155 also allows the user to enter his/her billing information in the "enter billing information" element 435. The customization GUI 155 also allows the user to enter his/her name in the "name" element 440. The customization GUI 155 also allows the user to enter his/her address in the "address" element 445. The customization GUI 155 also allows the user to enter his/her credit card number in the "credit card number" element 450. The customization GUI 155 then displays a subtotal 455 of all of the customizations selected in the customization-selection grid 470 (e.g., taxes and other surcharges or fees may be added on to the subtotal or included within it). The customization GUI 155 then allows the user to order the customization(s) selected in the customization-selection grid 470 using the "order customization" element 460.

Figure 5:
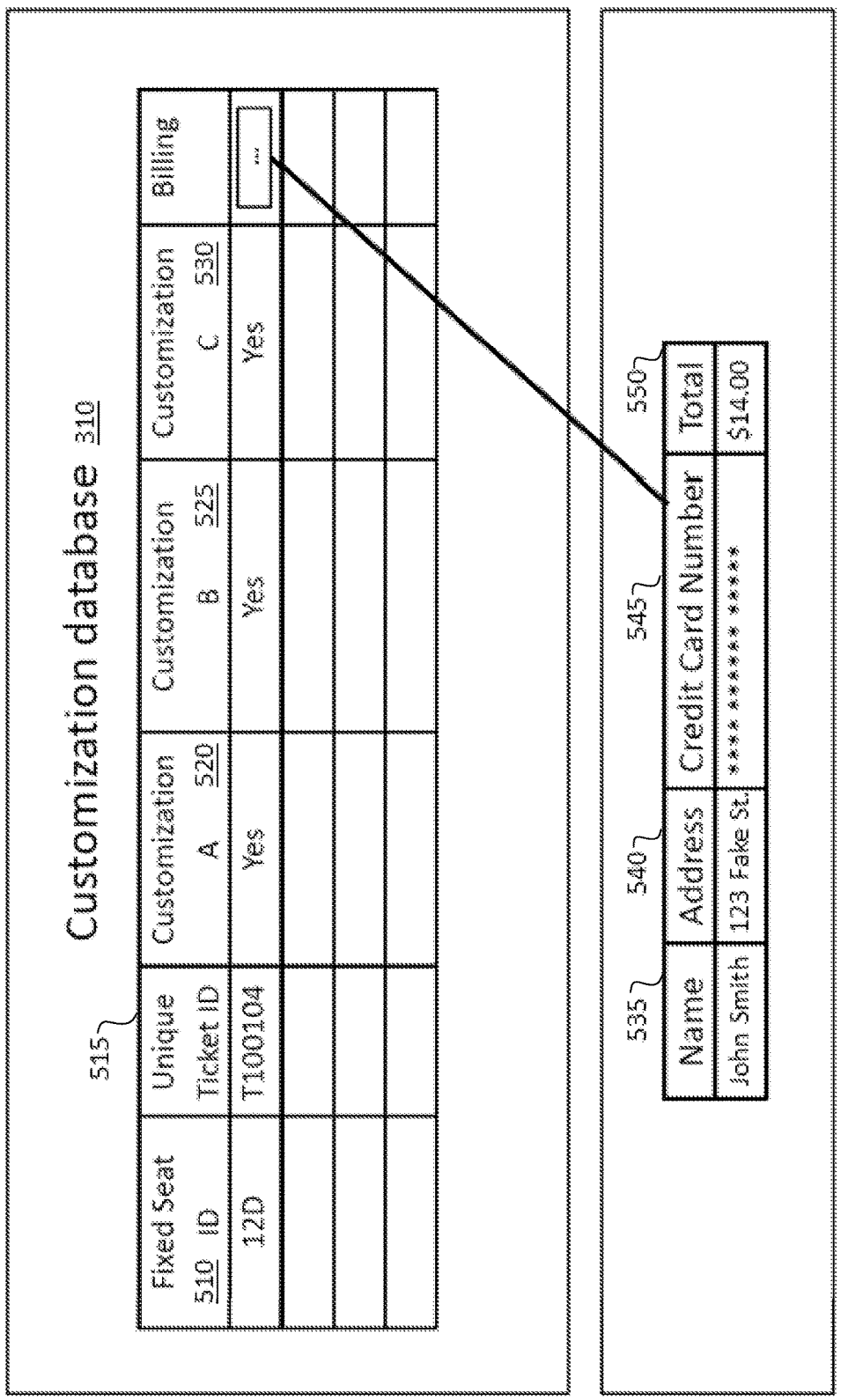
FIG. 5 illustrates an exemplary customization database.

FIG. 5 illustrates an exemplary customization database.

The exemplary customization database 310 of FIG. 5 includes information about customizations purchased (e.g., using the customization GUI 155 of FIG. 4). The information from the customization database 310 of FIG. 5 is organized into a number of columns.

In particular, the customization database 310 of FIG. 5 includes a "fixed seat ID" column 505 that identifies the seat identifier 110 of a particular seat 100 (e.g., "seat 12D"). The customization database 310 of FIG. 5 includes a "fixed seat ID" column 505 that identifies the seat identifier 110 of a particular seat 100 (e.g., "seat 12D"). The customization database 310 also includes a "unique ticket ID" column 510 that identifies the ticket identifier 145 of a particular ticket 140 (e.g., "ticket T100104"). The customization database 310 also includes a "customization A" column 515 that identifies whether the eventgoer associated with the seat 100 and ticket 140 identified in columns 505 and 510 purchased customization A 120 (e.g., using customization GUI 155). The customization database 310 also includes a "customization B" column 520 that identifies whether the eventgoer associated with the seat 100 and ticket 140 identified in columns 505 and 510 purchased customization B 125 (e.g., using customization GUI 155). The customization database 310 also includes a "customization C" column 525 that identifies whether the eventgoer associated with the seat 100 and ticket 140 identified in columns 505 and 510 purchased customization C 130 (e.g., using customization GUI 155). The customization database 310 also includes a "billing" column 530 that identifies various billing information about the eventgoer associated with the seat 100 and ticket 140 identified in columns 505 and 510, the information illustrated in FIG. 5 below the illustration of the customization database 310 in FIG. 5.

In particular, the billing information 530 may include the eventgoer's name 535 (e.g., "John Smith"), the eventgoer's address 540 (e.g., "123 Fake St."), the eventgoer's credit card number, and a total or subtotal paid by the eventgoer for the customizations and/or for the ticket 140 (e.g., subtotal "$14.00" as identified in subtotal 455 of FIG. 4).

While the customization database 310 of FIG. 5 is illustrated with only a single entry identifying a single ticket and seat combination, it should be understood that the customization database 310 may include numerous entries (e.g., enough to fill an entire event venue for one event, or for more than one event if another column is added identifying the event or the time and/or date).

Figure 6:
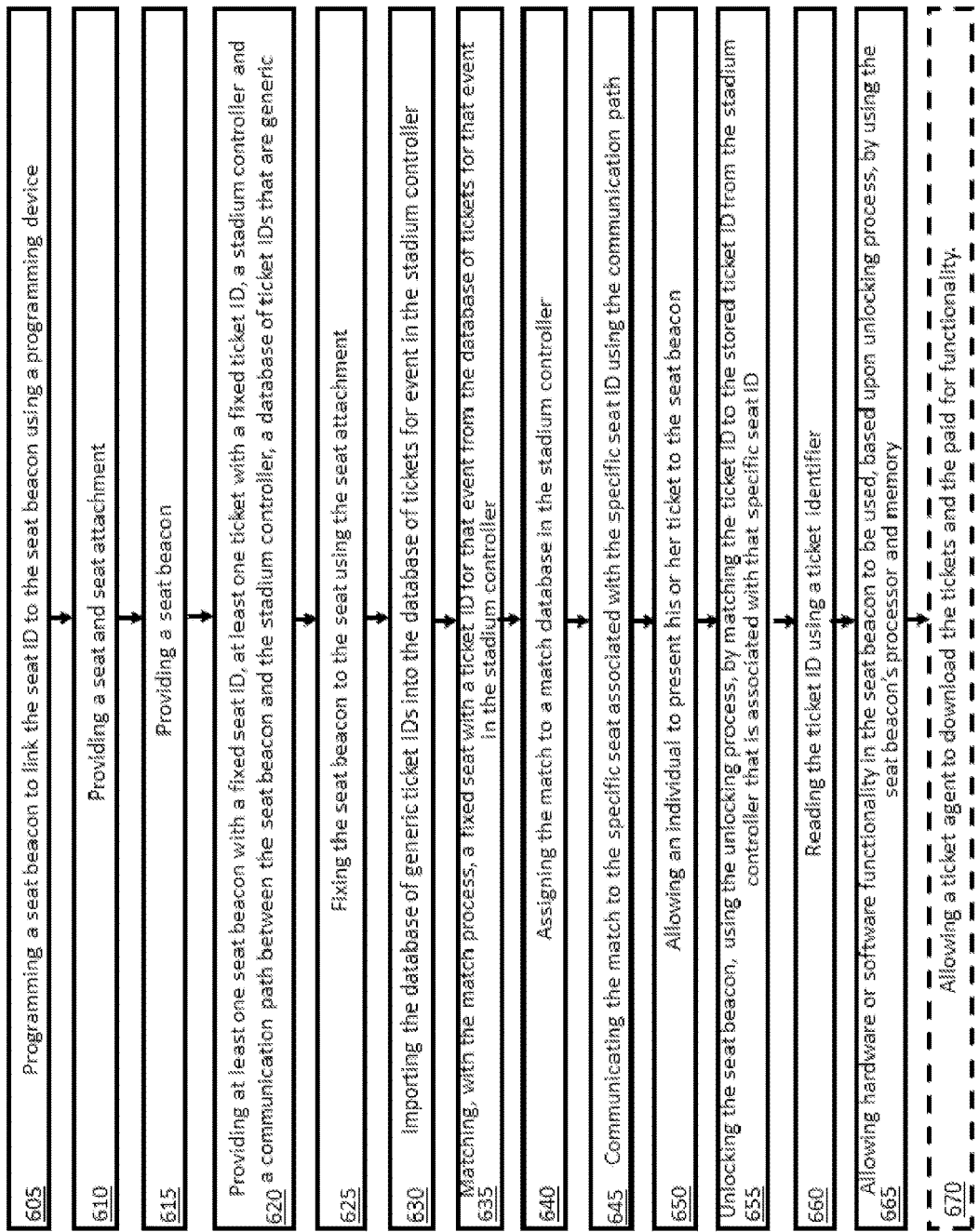
FIG. 6 illustrates an exemplary overall seat beacon method of the present invention as described herein.

FIG. 6 illustrates an exemplary overall seat beacon method of the present invention as described herein.

The overall method includes, at step 605, programming a seat beacon 105 to link the seat ID 110 to the seat beacon 105 using a programming device.

The overall method includes, at step 610, providing a seat 100 and seat attachment 115.

The overall method includes, at step 615, providing a seat beacon 105.

The overall method includes, at step 620, providing at least one seat beacon 105 with a fixed seat ID 110, at least one ticket 140 with a fixed ticket ID 145, a stadium controller 170 and a communication path 135 between the seat beacon 105 and the stadium controller 170, a database 175 of ticket IDs that are generic (e.g., the database 175 can include ticket IDs associated with multiple events and/or the ticket IDs need not be associated with particular seats yet).

The overall method includes, at step 625, affixing the seat beacon 105 to the seat 100 using the seat attachment 115.

The overall method includes, at step 630, importing the database 175 of generic ticket IDs into the database 340 of tickets for event in the stadium controller 170.

The overall method includes, at step 635, matching, with the match process 320, a fixed seat ID 110 with a ticket ID 145 for that event from the database 340 of tickets for that event in the stadium controller 170.

The overall method includes, at step 640, assigning the match to a match database 305 in the stadium controller 170.

The overall method includes, at step 645, communicating the match to the specific seat 100 associated with the specific seat ID 110 using the communication path 135.

The overall method includes, at step 650, allowing an individual to present his or her ticket 140 to the seat beacon 105.

The overall method includes, at step 655, unlocking the seat beacon 105, using the unlocking process, by matching the ticket ID 145 of the ticket 140 to the stored ticket ID 145 from the stadium controller 175 that is associated with that specific seat ID 110.

The overall method includes, at step 660, reading the ticket ID 145 using a ticket identifier 245.

The overall method includes, at step 665, allowing hardware functionality 230 and/or software functionality 235 in the seat beacon 205 to be used, based upon unlocking process 210, by using the seat beacon 105's processor and memory The overall method includes, at step 670, allowing a ticket agent (e.g., which may manage or administrate the ticket database 175) to download the tickets and the paid for functionality.

Figure 7:
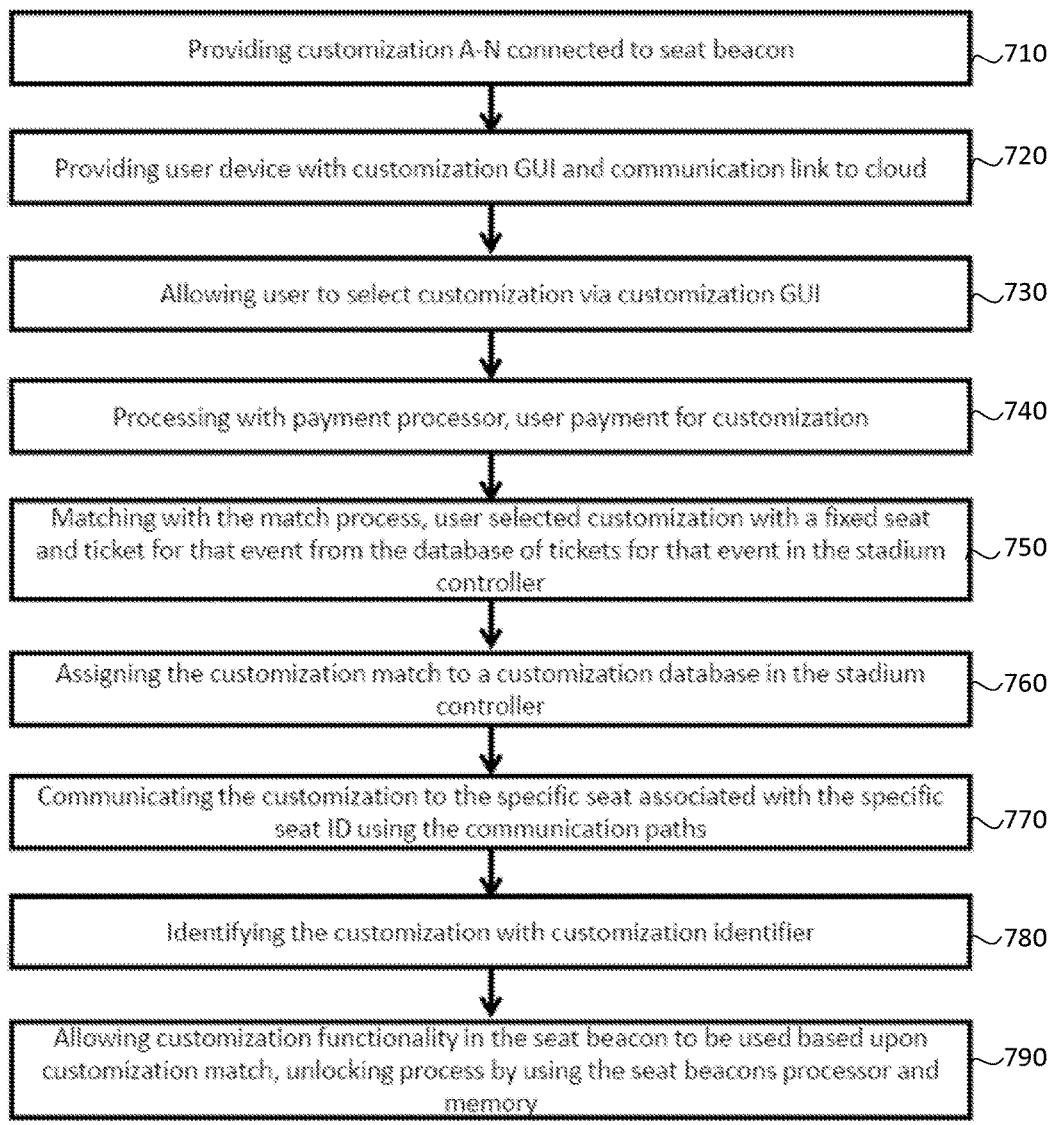
FIG. 7 illustrates an exemplary overall customization method of the present invention as described herein.

FIG. 7 illustrates an exemplary overall customization method of the present invention as described herein.

The overall method includes, at step 710, providing customization(s) A-N connected to seat beacon 105.

The overall method includes, at step 720, providing a user device 150 with a customization GUI 155 and a communication module 165 linked to a network or the internet 160.

The overall method includes, at step 730, allowing user to select customization(s) via customization GUI 155.

The overall method includes, at step 740, processing with payment processor 315, user payment for customization(s).

The overall method includes, at step 750, matching with the match process 320, user selected customization(s) with a fixed seat ID 110 and ticket ID 145 for that event from the database 340 of tickets for that event in the stadium controller 170.

The overall method includes, at step 760, assigning the customization match to a customization database 310 in the stadium controller 170.

The overall method includes, at step 770, communicating the customization(s) to the specific seat 100 associated with the specific seat ID using the communication paths 135.

The overall method includes, at step 780, identifying the customization(s) with customization identifiers.

The overall method includes, at step 790, allowing customization functionality 225 in the seat beacon 105 to be used based upon customization match, unlocking process 210 by using the seat beacon 105's processor 220 and memory 215.

Figure 8:
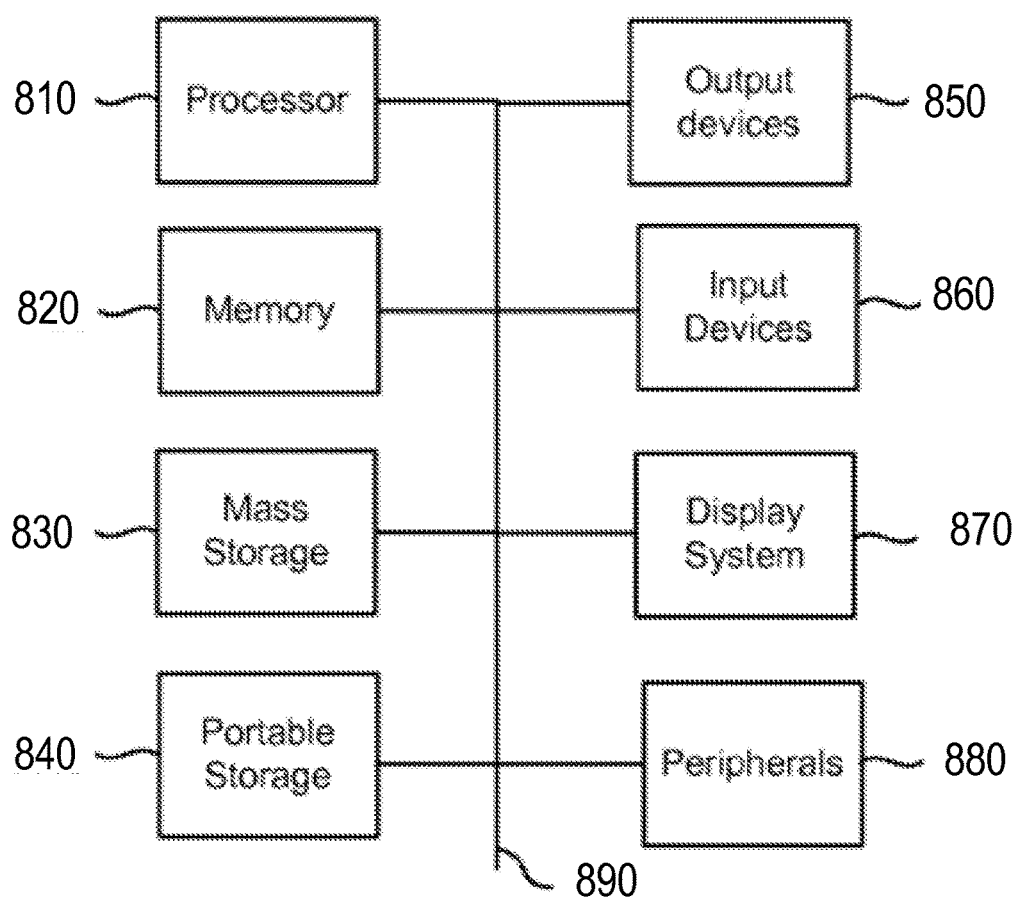
FIG. 8 is a block diagram of an exemplary computing device that may be used to implement an embodiment of the present invention.

FIG. 8 illustrates an exemplary computing system 800 that may be used to implement an embodiment of the present invention. The computing system 800 of FIG. 8 includes one or more processors 810 and memory 810. Main memory 810 stores, in part, instructions and data for execution by processor 810. Main memory 810 can store the executable code when in operation. The system 800 of FIG. 8 further includes a mass storage device 830, portable storage medium drive(s) 840, output devices 850, user input devices 860, a graphics display 870, and peripheral devices 880.

The components shown in FIG. 8 are depicted as being connected via a single bus 890. However, the components may be connected through one or more data transport means. For example, processor unit 810 and main memory 810 may be connected via a local microprocessor bus, and the mass storage device 830, peripheral device(s) 880, portable storage device 840, and display system 870 may be connected via one or more input/output (I/O) buses.

Mass storage device 830, which may be implemented with a magnetic disk drive or an optical disk drive, is a non-volatile storage device for storing data and instructions for use by processor unit 810. Mass storage device 830 can store the system software for implementing embodiments of the present invention for purposes of loading that software into main memory 810.

Portable storage device 840 operates in conjunction with a portable non-volatile storage medium, such as a floppy disk, compact disk or Digital video disc, to input and output data and code to and from the computer system 800 of FIG. 8. The system software for implementing embodiments of the present invention may be stored on such a portable medium and input to the computer system 800 via the portable storage device 840.

Input devices 860 provide a portion of a user interface. Input devices 860 may include an alpha-numeric keypad, such as a keyboard, for inputting alpha-numeric and other information, or a pointing device, such as a mouse, a trackball, stylus, or cursor direction keys. Additionally, the system 800 as shown in FIG. 8 includes output devices 850. Examples of suitable output devices include speakers, printers, network interfaces, and monitors.

Display system 870 may include a liquid crystal display (LCD) or other suitable display device. Display system 870 receives textual and graphical information, and processes the information for output to the display device.

Peripherals 880 may include any type of computer support device to add additional functionality to the computer system. For example, peripheral device(s) 880 may include a modem or a router.

The components contained in the computer system 800 of FIG. 8 are those typically found in computer systems that may be suitable for use with embodiments of the present invention and are intended to represent a broad category of such computer components that are well known in the art. Thus, the computer system 800 of FIG. 8 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, Android, iOS, and other suitable operating systems.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.).

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A system for event venue seat interaction, the system comprising:
    one or more sensors associated with a seat at an event venue, the seat associated with a unique seat identifier, wherein the one or more sensors detect that a user is currently sitting in the seat;
    detecting, by the one or more sensors, that the user is currently sitting in the seat;
    a seat beacon attached to the seat, wherein the seat beacon comprises a user interface that:
        in response to the detecting, and for a predetermined time period following the user being detected via the seat beacon, triggers a mobile device of the user to display a request for ticket information including at least,
        a ticket identifier and the unique seat identifier; and
        in response to the request, interface with the mobile device of the user and thereby receive the ticket identifier and the unique seat identifier from the mobile device of the user within the predetermined time period;
    an event venue controller, including a processor that executes instructions stored in a memory of the event venue controller, that:
        receives the ticket identifier and the unique seat identifier in an electronic communication transmitted from the seat beacon attached to the seat,
        in response to receiving the ticket information at the event venue controller, queries a ticket database to determine that the received ticket identifier and unique seat identifier match stored ticket purchase information for the unique seat identifier associated with the seat,
        transmits a match response to the seat beacon, the match response indicating that the received ticket identifier and unique seat identifier match the stored ticket purchase information associated with the seat, wherein the user is identified by the event venue controller as being authorized to continue sitting in the seat and activates an ordering feature of the seat beacon based on the matched response,
        in response to identifying the user as being authorized, receives a transaction order from the seat beacon, the transaction order being placed by the authorized user requesting goods or services from one or more specified providers associated with the event venue, whereby the user places the order by interacting with a user interface of the seat beacon attached to the seat, and
        transmits an action command to at least one of the providers associated with the event venue for fulfillment of the received transaction order based on identification of an authorized status of the user.

2. The system of claim 1, wherein execution of the instructions by the processor of the event venue controller further processes a payment identified within the transaction order.

3. The system of claim 1, wherein the transaction order requests at least one of a food item or a drink item.

4. The system of claim 1, wherein the transaction order requests access to a wireless Wi-Fi network.

5. The system of claim 1, wherein the transaction order requests a seat customization of the seat associated with the seat beacon.

6. The system of claim 1, wherein the provider is one of a food vendor or a drink vendor.

7. The system of claim 1, wherein the provider is the seat beacon.

8. The system of claim 1, wherein the ticket database is stored locally at a storage device associated with the event venue.

9. The system of claim 1, wherein the ticket database is stored remotely and is associated with a ticket vendor service.

10. The system of claim 5, wherein the seat customization includes at least one of a seat heater, name tag, and cooling cup.

11. The system of claim 1, wherein the sensors include at least one pressure sensor.

12. The system of claim 1, wherein the sensors include at least one thermal sensor.

13. The system of claim 1, wherein the event venue controller further notifies the user device regarding a reward upon the user being identified as being authorized to continue sitting in the seat based on the matched response.

14. The system of claim 13, wherein the reward includes a discount on food, drinks, or event memorabilia.

15. The system of claim 1, wherein the displayed request for ticket information is associated with the predetermined time interval, and wherein failure to provide the ticket information within the predetermined time interval results in a penalty.

16. The system of claim 15, wherein the penalty includes denying use of the seat beacon for requesting goods or services.

17. The system of claim 15, wherein the penalty includes an adjustment of the seat into position known to be uncomfortable.

18. The system of claim 15, wherein the penalty includes activation of a signal indicating that the user is sitting in the wrong seat.

19. The system of claim 18, wherein the signal includes a light indicator, sign, displayed message on the user interface, or an alert signal/message.

\* \* \* \* \*